R. B. HUGUNIN.
Making Rubber Articles.
No. 53,002.
Patented March 6, 1866.
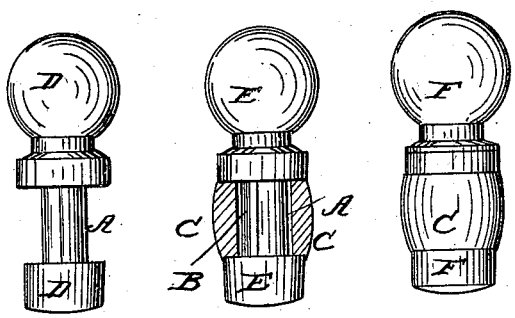
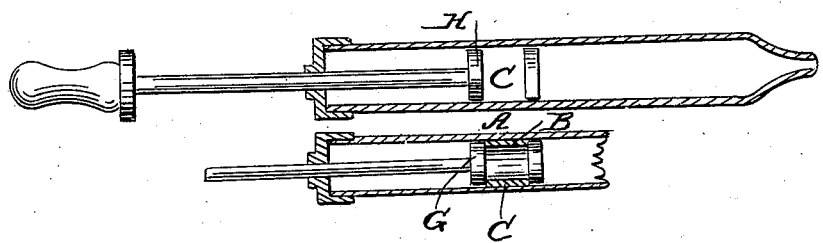
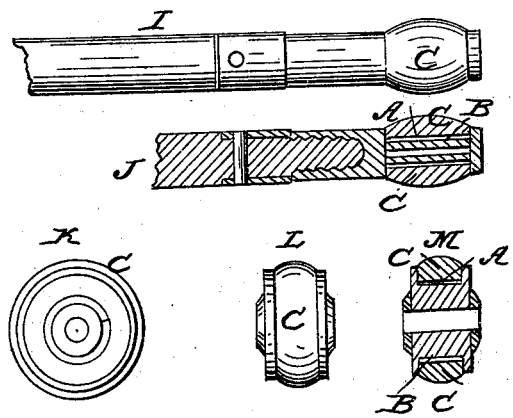
Witnesses.
John Hollingshead
Z. B. Brooke
Inventor:
R. B. Hugunin

UNITED STATES PATENT OFFICE.

R. B. HUGUNIN, OF CLEVELAND, OHIO.

IMPROVEMENT IN THE MANUFACTURE OF BOTTLE-STOPPERS, CASTER-WHEELS, SYRINGE-PISTONS, &c.

Specification forming part of Letters Patent No. 53,002, dated March 6, 1866.

*To all whom it may concern:*

Be it known that I, R. B. HUGUNIN, of the city of Cleveland, county of Cuyahoga, and State of Ohio, have invented a new and useful Improvement in the Manufacture of Bottle-Stoppers, Caster-Rollers, Gun-Cleaners, Syringe-Plungers, &c.; and I do hereby declare that the following is a full, clear, and exact description of the same, reference being had to the accompanying drawings, making a part of this specification, &c.

This invention consists of vulcanizing rubber into grooves, covered with cloth or other fabric, so as to make bottle-stoppers, caster-rollers, gun-cleaners, syringe-plungers, &c.

The drawings show, as per Figure 1, a glass stopper before being covered, a section when covered, and one complete; Fig. 2, syringe-plunger in section and complete; Fig. 3, gun-cleaner in section and complete; Fig. 4, caster-roller in section and complete.

Similar letters of reference indicate corresponding parts in all the figures.

To enable those skilled in the art to fully understand my invention, I will proceed to describe its construction and operation.

A A, &c., grooves made in the glass or metal for a bed for the cloth and rubber covering.

B B, &c., raw-gum-prepared cloth passing around the bottom of the groove, and tightly drawn and secured by being pressed down together, where they will unite, the raw gum on the cloth being adhesive. This cloth makes a firm foundation for the rubber which is put over it.

C C, &c., rubber vulcanized, in proper thickness, hardness, and shape, upon and around the outer surface of the cloth B B, &c. When it is necessary to fasten the covering so as to prevent its turning round it may be done by making or molding an opening clear through from the bottom of the groove. One end of the cloth may then be passed through, and the two ends lapped around in different directions or otherwise and pressed down and thus united, as before described.

D, E, and F, glass stoppers, one ready for the cloth and rubber, and another partially covered, and the other covered as in use.

G and H, syringe-plungers, with cloth and rubber on in one and partially removed on the other.

I J, gun-cleaner, covered and partly covered. The metal part of the gun-cleaner is so arranged that the covering can be taken off when worn out and another put on in its place by means of a screw and small collar screwed on and off, &c.

K and L, side and top views of caster-roller complete; M, cross-section of the caster-roller.

In operation the advantages of these cloth-supported elastic coverings may be briefly described as follows: In the stopper, the rubber, from its elasticity and ability to fill irregular places by pressure, does away with the necessity of grinding the stopper to fit a particular bottle, as is the case where glass stoppers simply are used.

The syringe-plunger rubber, by its natural elasticity, allows the plunger to move freely without the escape of the liquid, as is the case with the cork (now used for a similar purpose) after it becomes dry.

In the gun-cleaner the elasticity of the rubber makes a close fit to the bore of the gun and scours the same while being moved forward and back. This cleaner is so made as to be screwed onto the end of the gun-stick and taken off at pleasure.

The caster, having the rubber only on the floor, is comparatively noiseless. The softness of the roller prevents injury to the carpeting when moving heavy furniture with them on.

Having thus described my invention, what I claim, and desire to secure by Letters Patent, is—

1. Forming articles, such as herein described, by vulcanizing rubber or equivalent gum upon cloth or other fabric, in the manner and for the purposes herein set forth.

2. As new articles of manufacture, the improved bottle-stoppers, casters, gun-cleaners, and plungers herein described.

R. B. HUGUNIN.

Witnesses:
JOHN S. HOLLINGSHEAD,
Z. B. BROOKE.